(12) United States Patent
Kasuga

(10) Patent No.: US 10,469,815 B2
(45) Date of Patent: Nov. 5, 2019

(54) PROJECTOR AND CONTROL METHOD FOR PROJECTOR THAT DETECTS A CHANGE OF POSITION BASED ON CAPTURED IMAGE

(71) Applicant: SEIKO EPSON CORPORATION, Tokyo (JP)

(72) Inventor: Hirofumi Kasuga, Matsumoto (JP)

(73) Assignee: SEIKO EPAON CORPORATION, Tokyo (JP)

( * ) Notice: Subject to any disclaimer, the term of this patent is extended or adjusted under 35 U.S.C. 154(b) by 9 days.

(21) Appl. No.: 15/560,309

(22) PCT Filed: Mar. 18, 2016

(86) PCT No.: PCT/JP2016/001604
§ 371 (c)(1),
(2) Date: Sep. 21, 2017

(87) PCT Pub. No.: WO2016/157805
PCT Pub. Date: Oct. 6, 2016

(65) Prior Publication Data
US 2018/0063496 A1    Mar. 1, 2018

(30) Foreign Application Priority Data
Mar. 30, 2015   (JP) ................. 2015-068263

(51) Int. Cl.
*H04N 9/31*    (2006.01)
*G06T 7/73*    (2017.01)
(Continued)

(52) U.S. Cl.
CPC ........... *H04N 9/3194* (2013.01); *G03B 17/54* (2013.01); *G03B 21/145* (2013.01); *G06T 7/73* (2017.01);
(Continued)

(58) Field of Classification Search
CPC .. H04N 9/3194; H04N 9/3185; H04N 5/7475; G06T 7/73; G03B 21/145; G03B 17/54
See application file for complete search history.

(56) References Cited

U.S. PATENT DOCUMENTS 4,036,459 A * 7/1977 Alexander ............. F16M 11/10
                                                    248/663
4,199,257 A * 4/1980 Dosch .................... G01B 11/27
                                                    343/703
(Continued)

FOREIGN PATENT DOCUMENTS

| JP | H05-164835 A | 6/1993 |
| JP | 2005-164361 A | 6/2005 |

(Continued)

*Primary Examiner* — Jamie J Atala
*Assistant Examiner* — Michael Robert Cammarata
(74) *Attorney, Agent, or Firm* — Oliff PLC

(57) ABSTRACT

A change in position or direction of a projector may be detected by a simple configuration. A projector includes a light projection unit that projects an image, a projection unit main body that houses the light projection unit, and a power supply housing part that supports the projection unit main body. Further, the projector includes an imaging part provided in either of the power supply housing part or projection unit main body, and a control unit that detects a relative position or relative direction between the projection unit main body and the power supply housing part based on a captured image of the imaging part.

10 Claims, 5 Drawing Sheets

(51) Int. Cl.
*G03B 21/14* (2006.01)
*G03B 17/54* (2006.01)
*H04N 21/41* (2011.01)

(52) U.S. Cl.
CPC ......... *H04N 9/3141* (2013.01); *H04N 9/3185* (2013.01); *H04N 21/4122* (2013.01); *G06T 2207/30204* (2013.01); *G06T 2207/30244* (2013.01)

(56) References Cited

U.S. PATENT DOCUMENTS

| | | | | |
|---|---|---|---|---|
| 5,890,787 | A * | 4/1999 | McNelley | G03B 15/10 348/E5.13 |
| 7,156,359 | B2 * | 1/2007 | Dittmer | F16M 11/041 248/551 |
| 2001/0000300 | A1 * | 4/2001 | Haile-mariam | F16M 11/046 353/30 |
| 2007/0115361 | A1 * | 5/2007 | Bolas | H04N 5/74 348/189 |
| 2007/0171380 | A1 * | 7/2007 | Wright | G03B 21/14 353/69 |
| 2008/0062164 | A1 * | 3/2008 | Bassi | H04N 9/3147 345/214 |
| 2008/0101725 | A1 * | 5/2008 | Lin | G06K 9/3216 382/286 |
| 2008/0291342 | A1 * | 11/2008 | Hirai | H04N 5/74 348/745 |
| 2009/0244492 | A1 * | 10/2009 | Perkins | G03B 21/10 353/69 |
| 2010/0193650 | A1 * | 8/2010 | Dittmer | F16M 11/041 248/222.51 |
| 2012/0262728 | A1 * | 10/2012 | Bridges | G01C 15/002 356/614 |
| 2012/0300044 | A1 * | 11/2012 | Thomas | H04N 9/3147 348/51 |
| 2013/0123645 | A1 * | 5/2013 | Stimson | A61B 5/1118 600/476 |
| 2014/0285777 | A1 | 9/2014 | Inoue | |
| 2015/0237317 | A1 * | 8/2015 | Ehara | H04N 9/3185 348/745 |
| 2015/0377606 | A1 * | 12/2015 | Thielemans | G01B 21/047 356/625 |
| 2016/0231645 | A1 * | 8/2016 | Mahoor | G03B 21/10 |
| 2016/0314727 | A1 * | 10/2016 | Bui | G06T 7/80 |
| 2017/0054863 | A1 * | 2/2017 | Moore | H04N 1/00761 |
| 2017/0167702 | A1 * | 6/2017 | Mariampillai | F21V 21/28 |

FOREIGN PATENT DOCUMENTS

| | | | |
|---|---|---|---|
| JP | 2010-85253 A | | 4/2010 |
| JP | 2010-86928 A | | 4/2010 |
| JP | 2012058600 A | * | 3/2012 |
| JP | 2012-255988 A | | 12/2012 |
| JP | 2013-005073 A | | 1/2013 |
| JP | 2013-195498 A | | 9/2013 |
| JP | 2014-187512 A | | 10/2014 |
| WO | WO-2007002353 A2 | * | 1/2007 ............... H04N 5/74 |
| WO | WO-2016018327 A1 | * | 2/2016 ............ H04N 9/3179 |

* cited by examiner

PROJECTOR AND CONTROL METHOD FOR PROJECTOR THAT DETECTS A CHANGE OF POSITION BASED ON CAPTURED IMAGE

TECHNICAL FIELD

This invention relates to a projector that projects images and a control method for the projector.

BACKGROUND ART

In related art, a configuration in which a projector is installed, then, the projector is moved, and thereby, the orientation of the optical axis of the projection light can be changed is known (for example, see PTL 1). In the projector described in PTL 1, horizontal rotation and vertical rotation of the projector can be performed for directing the optical axis of the projection light to an object to be irradiated.

CITATION LIST

Patent Literature

PTL 1: JP-A-2010-86928

SUMMARY OF INVENTION

Technical Problems

The projector described in PTL 1 respectively detects amounts of rotation of the horizontal rotation and the vertical rotation of the optical axis using angle sensors. In application of the configuration, angle sensors are used with respect to each axis about which the projector is moved. Accordingly, in a configuration in which the position and orientation of the projector can be changed, there is a problem that, with the higher degree of freedom of change, more sensors are required and complication of the apparatus configuration is caused.

The invention has been achieved in view of the above described circumstances, and a purpose of the invention is to detect changes in position or orientation of a projector by a simple configuration.

Solution to Problems

In order to achieve the above described purpose, a projector of the invention includes a projection unit that projects an image, a main body that houses the projection unit, an attachment part that supports the main body, an imaging part provided in one of the attachment part and the main body, and a detection unit that detects a relative position or relative direction between the main body and the attachment part based on a captured image of the imaging part.

According to the invention, the relative position or relative direction between the main body and the attachment part may be detected by a simple configuration using the imaging part. Accordingly, for example, when the main body moves with respect to the attachment part and the relative position or relative direction changes, the change may be detected. Further, even in a configuration with a higher degree of freedom of motion, the configuration is not necessarily complicated therefor.

In the projector of the invention, the imaging part is provided in the attachment part and images the main body.

According to the invention, the relative position or relative direction of the main body with respect to the attachment part may be detected using the captured image.

In the projector of the invention, the imaging part is provided in the main body and images the attachment part.

According to the invention, the relative position or relative direction of the main body with respect to the attachment part may be detected using the captured image.

In the projector of the invention, the detection unit detects the relative position or relative direction between the main body and the attachment part based on a change of the main body or attachment part contained in the captured image of the imaging part from a reference state.

According to the invention, the relative position or relative direction between the main body and the attachment part may be quickly obtained using the captured image.

In the projector of the invention, a predetermined mark is provided in the main body or the attachment part within an imaging range of the imaging part, and the detection unit detects the relative position or relative direction between the main body and the attachment part based on a change of the mark contained in the captured image of the imaging part from the reference state.

According to the invention, the relative position or relative direction between the main body and the attachment part may be quickly obtained using the mark as a reference.

In the projector of the invention, the main body is coupled to the attachment part by a coupling part that can rotate about at least one axis, and the detection unit detects a relative angle between the main body and the attachment part around a rotation axis of the coupling part.

In the projector of the invention, a reference scale is provided in the imaging range of the imaging part, and the detection unit detects the relative position or relative direction between the main body and the attachment part by detecting an image of the reference scale and an image of the main body appearing in the captured image of the imaging part.

According to the invention, the relative position or relative direction between the main body and the attachment part may be detected by higher-accuracy and lighter-load processing using the reference scale.

In the projector of the invention, the imaging part includes an imaging lens, and a cover is attached to the imaging lens and the reference scale is formed in the cover.

According to the invention, the cover is attached to the imaging lens, and thereby, the reference scale may be used.

In the projector of the invention, the cover is rotatably attached with respect to the imaging lens.

According to the invention, the orientation of the reference scale may be adjusted by rotation of the cover.

In the projector of the invention, the imaging part is detachably provided in the attachment part or the main body.

According to the invention, the imaging part may be attached to the attachment part and used, and the imaging part may be detached when not in use.

In the projector of the invention, a correction unit is provided that corrects an image projected by the projection unit based on the relative position or relative direction between the main body and the attachment part detected by the detection unit.

According to the invention, the projected image may be appropriately corrected according to the orientation of the main body and workload of the user may be reduced.

In order to achieve the above described purpose, a control method for a projector of the invention includes, in the projector, by the projector including a main body housing a projection unit that projects an image and an attachment part that supports the main body, detecting a relative position or relative direction between the main body and the attachment part based on a captured image of an imaging part provided in the attachment part or the main body, and correcting a projected image based on the detected relative position or relative direction.

According to the invention, the relative position or relative direction between the main body and the attachment part may be detected by a simple configuration using the imaging part. Accordingly, for example, when the main body moves with respect to the attachment part and the relative position or relative direction changes, the change may be detected. Further, even in a configuration with a higher degree of freedom of motion, the configuration is not necessarily complicated therefor.

DESCRIPTION OF EMBODIMENTS

Figure 1:
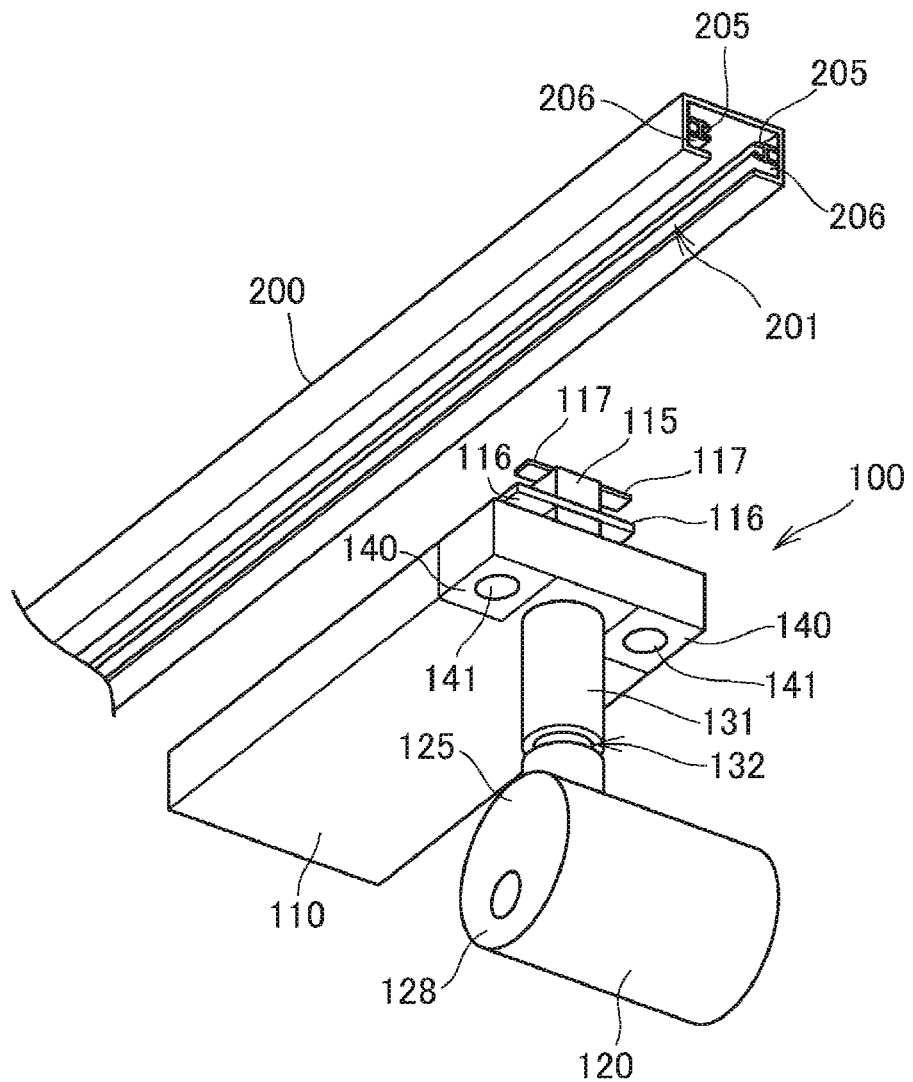
FIG. 1 is an appearance diagram of a projector according to an embodiment.

FIGS. 1 and 2 are appearance diagrams of a projector 100 according to an embodiment to which the invention is applied. FIG. 1 is a configuration diagram of the projector 100, FIG. 2A is a side view, and FIG. 2B is a front view. Further, FIG. 2C is a side view of an imaging unit 140 and FIG. 2D is a plan view of the imaging unit 140. In FIG. 1, a lighting duct 200 to which the projector 100 is attached is also shown.

As will be described later, the projector 100 is a projector containing a light source, modulates light emitted by the light source as image light, and projects images on a wall surface or screen.

The projector 100 includes a power supply housing part 110 (attachment part), a projection unit main body 120 (main body) formed separately from the power supply housing part 110, and a supporting shaft 131 that couples the power supply housing part 110 and the projection unit main body 120. The power supply housing part 110 has a casing in an elongated nearly box shape and houses a power supply circuit (not shown) etc. in the casing. The projection unit main body 120 has a nearly cylindrical casing and houses a light projection unit 20 (FIG. 4) etc.

The projector 100 connects to the lighting duct 200 fixed to a ceiling or wall surface. The lighting duct 200 is a power supply unit having a gutter shape and corresponds to e.g. a JIS C8366 standard luminaire duct, power supply duct, or power supply sharing duct. A luminaire, an adapter for power supply, or the like can be attached to the lighting duct 200. In FIG. 1, for convenience of understanding, the section of the lighting duct 200 is shown, however, the end surface of the lighting duct 200 in the longitudinal direction may be closed or opened. The lighting duct 200 is installed on a ceiling surface, wall surface, or the like and connected to a commercial power source (not shown), and supplies electric power to the above described luminaire or adapter.

The lighting duct 200 has an opening 201 in the hollow main body having a longitudinal shape extending along the longitudinal shape and supports a connector put in from the opening 201 or the like. When the lighting duct 200 is fixed to a ceiling surface, the opening 201 opens downward and a luminaire or the like is attached from below and suspended. Further, the lighting duct 200 may be fixed to a wall surface and, in this case, the opening 201 opens in the horizontal direction and a luminaire or the like is attached from side and secured thereto.

The lighting duct 200 has a pair of conductors 205 extended along the longitudinal direction of the lighting duct 200. The conductors 205 are made of copper or another metal molded in rod shapes or tape shapes and electrically connected to the commercial power source. The conductors 205 are connected to e.g. a commercial 100 V bipolar alternating-current power source, and one conductor 205 serves as a grounding pole and the other conductor 205 serves as a non-grounding pole. Further, the lighting duct 200 has grooves 206 that lock member having a larger width than the opening 201. The grooves 206 are provided on both sides of the opening 201 inside of the lighting duct 200, and an object fitted in the grooves 206 is supported by the lighting duct 200.

The power supply housing part 110 has a connector 115 that can be coupled to the lighting duct 200 on the upper surface of the casing. The connector 115 is a protrusion having a nearly cylindrical shape and protruding upward from the upper surface of the casing, and a pair of locking pieces 116 and a pair of contact conductors 117 are stood on side surfaces of the connector 115. The locking pieces 116 are molded in flat plate shapes and protrude from the connector 115 in opposite directions to each other. The contact conductors 117 are formed by molding of copper or another metal in flat plate shapes and the respective contact conductors 117 protrude from the connector 115 in opposite directions to each other.

When the projector 100 is attached to the lighting duct 200, the connector 115 is inserted into the opening 201. The connector 115 is inserted into the opening 201 with the locking pieces 116 and the contact conductors 117 oriented along the longitudinal direction of the lighting duct 200. When the locking pieces 116 and the contact conductors 117 enter the lighting duct 200 and the power supply housing part 110 is rotated to 90 degrees, the connector 115 connects to the lighting duct 200. The power supply housing part 110 is rotated, and thereby, the contact conductors 117 come into contact and conduction with the conductors 205 of the lighting duct 200 and electric power can be supplied from the conductors 205 to the contact conductors 117. Further, the locking pieces 116 are fitted into the grooves 206, and thereby, the connector 115 is fixed to the lighting duct 200 via the locking pieces 116. In this state, the connector 115 does not move even in the longitudinal direction of the lighting duct 200. When the power supply housing part 110 is connected to the lighting duct 200, the power supply circuit of the power supply housing part 110 is connected to a commercial alternating-current power source via the contact conductors 117 and the projector 100 becomes operable.

As described above, the projector 100 may be easily attached to the lighting duct 200 and, in the attached state, the projector 100 is suspended and supported from the lighting duct 200. Further, in the attached state, in the projector 100, the longitudinal direction of the power supply housing part 110 is oriented along the longitudinal direction of the lighting duct 200.

Note that a connector (not shown) for stabilizing the installation state of the projector 100 may be provided in the power supply housing part 110 separately from the connector 115. This connector has e.g. locking pieces (the same as the locking pieces 116) that interlock with turning of screws (not shown) and, for example, when the connector is fitted in the lighting duct 200 and the screws (not shown) are turned, engages with the lighting duct 200. The connector is provided in a position apart from the connector 115 on the upper surface of the power supply housing part 110, and thereby, the power supply housing part 110 may be supported more reliably in the orientation along the longitudinal direction of the lighting duct 200.

The supporting shaft 131 is provided in the power supply housing part 110. The supporting shaft 131 is a rod-shaped member stood downward in the installation state of the projector 100 on the bottom surface of the power supply housing part 110. The supporting shaft 131 is fixed to the power supply housing part 110 and coupled to the upper surface of the projection unit main body 120 via a ball joint 132 (coupling part), and supports the projection unit main body 120 with the power supply housing part 110. The projection unit main body 120 may change the orientation thereof freely with respect to the power supply housing part 110 around the ball joint 132 as a supporting point.

The projection unit main body 120 is formed in a nearly cylindrical shape and a projection opening 128 from which the light projection unit 20 (see FIG. 4) projects light is provided on a front surface 125 as a front end surface of the projection unit main body 120.

The projection opening 128 is an opening from which the light projection unit 20 (see FIG. 4) to be described later emits light, and may be covered by a light-transmissive lens or cover, a lens may be provided within the projection opening 128, or the opening may be a simple opening.

The optical axis of the light projected from the projection opening 128 is shown by a sign L. The optical axis L is parallel to the longitudinal directions (frontward and backward directions) of the projection unit main body 120.

As below, the motion of the projection unit main body 120 around the ball joint 132 as the supporting point will be explained with reference to respective axes X, Y, Z. The Y-axis is an axis parallel to the installation surface on which the lighting duct 200 is installed (e.g. ceiling surface) and along the longitudinal direction of the lighting duct 200. The Y-axis may be also referred to as an axis along the longitudinal direction of the power supply housing part 110. The X-axis is an axis parallel to the installation surface and perpendicular to the Y-axis, and the Z-axis is perpendicular to the X-axis and the Y-axis. Note that the respective axes X, Y, Z are for specification of directions and not limited to positions shown in FIG. 1 and the respective drawings, which will be described later.

The projection unit main body 120 is rotated about the X-axis around the ball joint 132 as the supporting point, and thereby, the optical axis L rotates about the X-axis. Further, the projection unit main body 120 is rotated about the Y-axis around the ball joint 132, and thereby, the optical axis L rotates about the Y-axis. Similarly, the projection unit main body 120 is rotated about the Z-axis, and thereby, the optical axis L rotates about the Z-axis.

Therefore, in the projector 100, the optical axis L may be freely moved in any direction of the three axis directions of the X-axis, Y-axis, and Z-axis with the power supply housing part 110 attached and fixed to the lighting duct 200, and light may be projected in a desired direction from the projection opening 128.

Figure 2A:
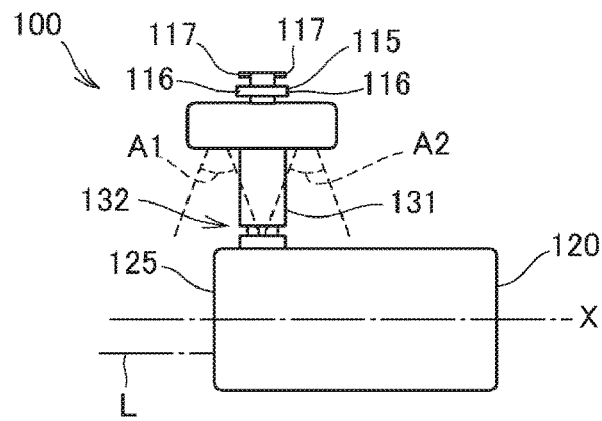
FIG. 2A is a side view of the projector.
Figure 2B:
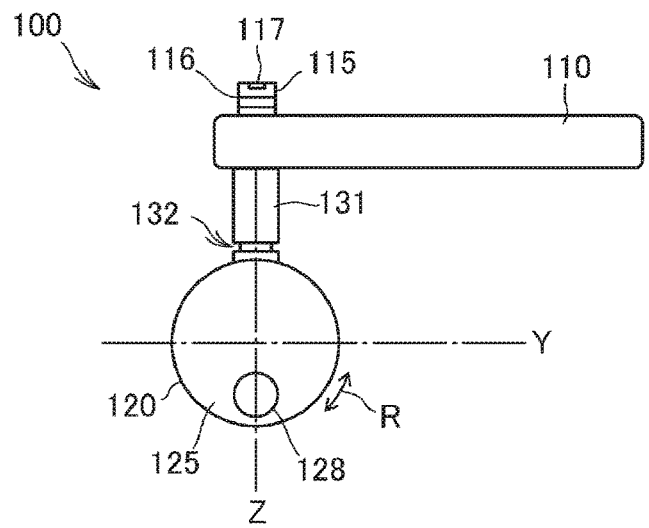
FIG. 2B is a front view of the projector.

On a surface of the power supply housing part 110 on the projection unit main body 120 side, i.e., the lower surface in the attached state, two imaging units 140 are provided. The imaging unit 140 includes an imaging part 141 including a digital camera and captures an image under the control of a control system 10 (FIG. 4), which will be described later. The imaging part 141 is provided to face the projection unit main body 120 side. FIG. 2A respectively shows imaging ranges A1, A2 of the two imaging parts 141. Both of the imaging ranges A1, A2 of the two imaging parts 141 are for imaging the upper surface of the projection unit main body 120.

The projection unit main body 120 is rotatable about the Z-axis by the ball joint and, for example, the front surface 125 is oriented toward one side (+X-direction) and the other side (−X-direction) in the X-axis directions. In the power supply housing part 110, the two imaging parts 141 are provided so that the tip end of the projection unit main body 120 (the end on the front surface 125 side) may be imaged regardless of the orientation of the projection unit main body 120. These imaging units 140 are provided, and thereby, at least one of the imaging ranges A1, A2 contains the tip end of the projection unit main body 120. Note that, in the case where the projection unit main body 120 is adapted to be oriented in one of the X-axis directions, only one imaging part 141 may be provided. Further, the imaging part 141 may include a wide-angle camera so that both sides may be imaged by the one imaging part 141.

The imaging part 141 has configuration parts (not shown) including an imaging device such as an imaging lens or CCD, a peripheral circuit part that reads signals from the imaging device and generates digital image data, etc. These configuration parts are housed in the imaging unit 140.

Figure 2C:
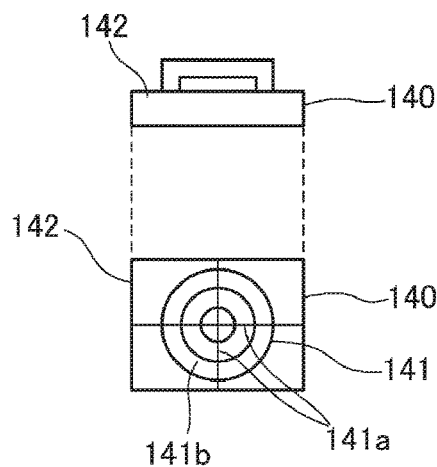
FIG. 2C is a side view of an imaging unit.
Figure 2D:
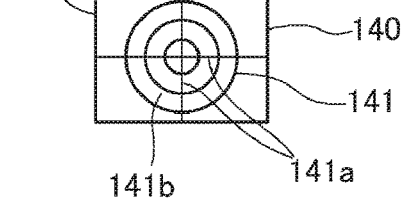
FIG. 2D is a plan view of the imaging unit.

As shown in FIGS. 2C and 2D, the imaging unit 140 is formed by unitization of the imaging part 141 and the peripheral circuit housed in a case 142 made of a synthetic resin or metal.

The imaging unit 140 is attached to the power supply housing part 110 and the respective parts of the imaging part 141 are electrically connected to the control system 10 (FIG. 4) housed in the power supply housing part 110.

The imaging unit 140 may be adapted to be detachable from the power supply housing part 110. In this case, it is preferable that, when the imaging unit 140 is fitted in the power supply housing part 110, the respective parts of the imaging part 141 housed in the imaging unit 140 are electrically connected to the control system 10 (FIG. 4) housed in the power supply housing part 110, and a general-purpose connector may be used, for example. When the imaging unit 140 is detachable, only one imaging unit 140 may be provided. In this case, the attachment part to which the imaging unit 140 is attached may be provided in the positions of the two imaging units 140 shown in FIG. 1. In the configuration, the imaging unit 140 may be attached to an appropriate attachment position according to the orientation of the tip end of the projection unit main body 120.

As shown in FIG. 2D, a cover 141b with reference lines 141a (reference scales) may be attached to the imaging lens (not shown) of the imaging part 141 in alignment with an axis P (FIG. 3A) referred to in detection processing, which will be described later. In this case, at manufacturing or installation of the projector 100, the positions of the reference lines 141a are adjusted to be ideal reference lines. In the embodiment, a configuration without the cover 141b is explained.

In the projector 100, the projection unit main body 120 (optical axis L) may be freely moved by the ball joint 132 as described above. The projector 100 detects the motion (tilt) of the projection unit main body 120 as rotations about the X-axis, Y-axis, and Z-axis using the captured images of the imaging parts 141.

FIG. 3 is an explanatory diagram of an operation of detecting the motion (tilt) of the optical axis L by the projector 100, and (A), (B), (C) and (E) show captured images D of the imaging part 141 and (D) and (E) show positions of the projection unit main body 120.

Figure 3A:
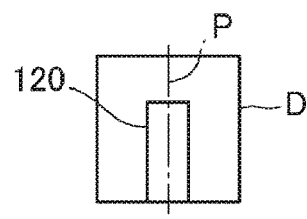
FIG. 3A is an explanatory diagram of an operation of detecting a projection direction by the projector.

As shown in FIG. 3A, the tip end of the projection unit main body 120 appears in the captured image D of at least one of the two imaging parts 141. Here, as shown in FIG. 2A and (B), a state in which the longitudinal direction of the projection unit main body 120, i.e., the direction of the optical axis L is parallel to the X-axis and the projection unit main body 120 is horizontal is referred to as "reference state" of the projection unit main body 120. All angles of the projection unit main body 120 with respect to the X-axis, Y-axis, and Z-axis in the reference state are zero degrees. Further, the longitudinal direction of the projection unit main body 120 in the reference state is the axis P. The axis P is fixed with respect to the imaging surface of the imaging part 141 and the axis P is located in a fixed position with respect to the captured image D. It is preferable that the positions in the Y-axis direction of the center of the imaging part 141 and the center of the supporting shaft 131 (ball joint 132) are the same. For the imaging part 141, as described above, an imaging region is set so that the front surface 125 of the projection unit main body 120 may fall within the imaging range.

Figure 3B:
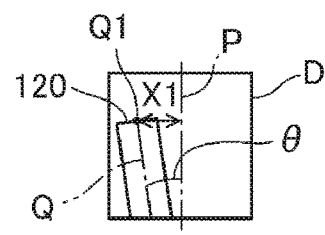
FIG. 3B is an explanatory diagram of an operation of detecting a projection direction by the projector.

FIG. 3B shows an example of the captured image D when the projection unit main body 120 is rotated about the Z-axis. In the captured image D of FIG. 3B, the projection unit main body 120 obliquely appears. With the longitudinal direction of the projection unit main body 120 as an axis Q, an angle θ between the axis P obtained from the captured image and the axis Q corresponds to the rotation angle of the projection unit main body 120 about the Z-axis. In the captured image D of FIG. 3B, the size of the image of the projection unit main body 120 is nearly unchanged compared to the captured image D in FIG. 3A. This is because the projection unit main body 120 has a cylindrical shape.

In the captured image D, letting a distance between a point Q1 on the axis Q on the tip end of the projection unit main body 120 to the axis P be x1 and a distance from an intersection between the axis P and the axis Q, i.e., the ball joint 132 to the point Q1 be r1, the following expression (1) holds with respect to the angle θ

$$\sin \theta = x1/r1 \qquad (1).$$

The distance between the imaging part 141 and the projection unit main body 120 is known, and the real size in the position on the upper surface of the projection unit main body 120 can be obtained from the number of pixels in the captured image D. Therefore, the distance x1 may be obtained from the captured image D. Further, the distance r1 is the distance from the front surface 125 to the ball joint 132 and known.

Therefore, the angle θ may be obtained by arithmetic processing of the following expression (2)

$$\theta = \sin^{-1}(x1/r1) \qquad (2).$$

Figure 3C:
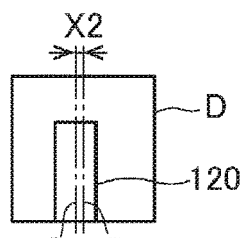
FIG. 3C is an explanatory diagram of an operation of detecting a projection direction by the projector.
Figure 3D:
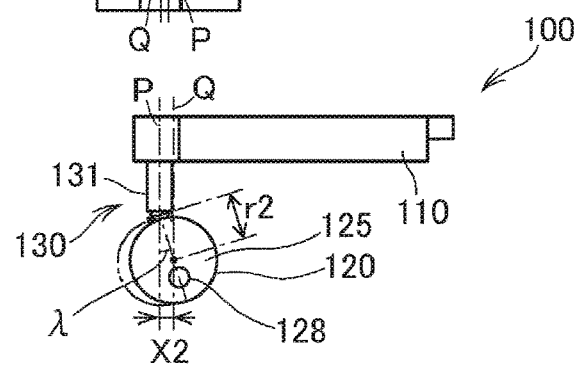
FIG. 3D is an explanatory diagram of an operation of detecting a projection direction by the projector.

FIG. 3C shows an example of the captured image D when the projection unit main body 120 is rotated about the X-axis, and (D) is a front view of the projector 100 when the projection unit main body 120 is rotated about the X-axis. The center of the rotation of the projection unit main body 120 is the ball joint 132, and thus, the image of the projection unit main body 120 shifts with the rotation in the captured image D. Letting the distance (amount of shift) between the axis Q of the projection unit main body 120 and the axis P in the reference state in this case be x2 and a distance from the ball joint 132 to the center of the front surface 125 in the surface parallel to the front surface 125 be r2, the following expression (3) holds with respect to a rotation angle λ of the projection unit main body 120

$$\sin \lambda = x2/r2 \qquad (3).$$

The distance x2 may be obtained from the captured image D. For example, if the center of the image of the projection unit main body 120 is obtained as the axis Q in the captured image D and the position of the axis P in the captured image D in the reference state is set or stored in advance, the distance x2 is obtained. Further, the distance r2 is also known and the value of the distance r2 may be stored in advance.

Therefore, the angle λ may be obtained by arithmetic processing of the following expression (4)

$$\lambda = \sin^{-1}(x2/r2) \qquad (4).$$

Figure 3E:
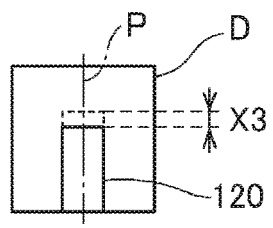
FIG. 3E is an explanatory diagram of an operation of detecting a projection direction by the projector.
Figure 3F:
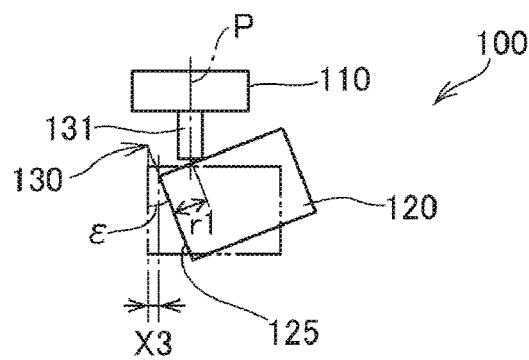
FIG. 3F is an explanatory diagram of an operation of detecting a projection direction by the projector.

FIG. 3E shows an example of the captured image D when the projection unit main body 120 is rotated about the Y-axis, and (F) is a side view of the projector 100 when the projection unit main body 120 is rotated about the Y-axis. The rotation center of the projection unit main body 120 is the ball joint 132, and thus, the position of the tip end of the projection unit main body 120 shifts with the rotation in the captured image D. Letting the amount of shift of the tip end of the projection unit main body 120 in this case be x3, the following expression (5) holds with respect to the above described distance r1 and a rotation angle ε of the projection unit main body 120

$$\cos \varepsilon = (r1-x3)/r1 \qquad (5).$$

Therefore, the angle ε may be obtained by the following expression (6)

$$\varepsilon = \cos^{-1}\{(r1-x3)/r1\} \qquad (6).$$

Note that the projection unit main body 120 rotates about the Y-axis and the captured image D is in the state shown in FIG. 3E in the cases where the tip end of the projection unit main body 120 rotates upward and rotates downward. As the method of distinguishing between these two cases, for example, when the image of the projection unit main body 120 in the captured image D is distorted into a trapezoidal shape by the rotation of the projection unit main body 120, the direction of the rotation of the projection unit main body 120 may be determined based on the shape of distortion.

As described above, the projector 100 may obtain the angles θ, λ, ε showing the direction of the optical axis L of the projection unit main body 120. Further, even when the motion of the projection unit main body 120 contains motions about plural axes of the respective axes of X, Y, Z, the direction of the optical axis L may be obtained in the above described manner. Here, the method of obtaining the direction of the optical axis L uses the above described arithmetic processing or an LUT (lookup table) stored in advance.

Figure 4:
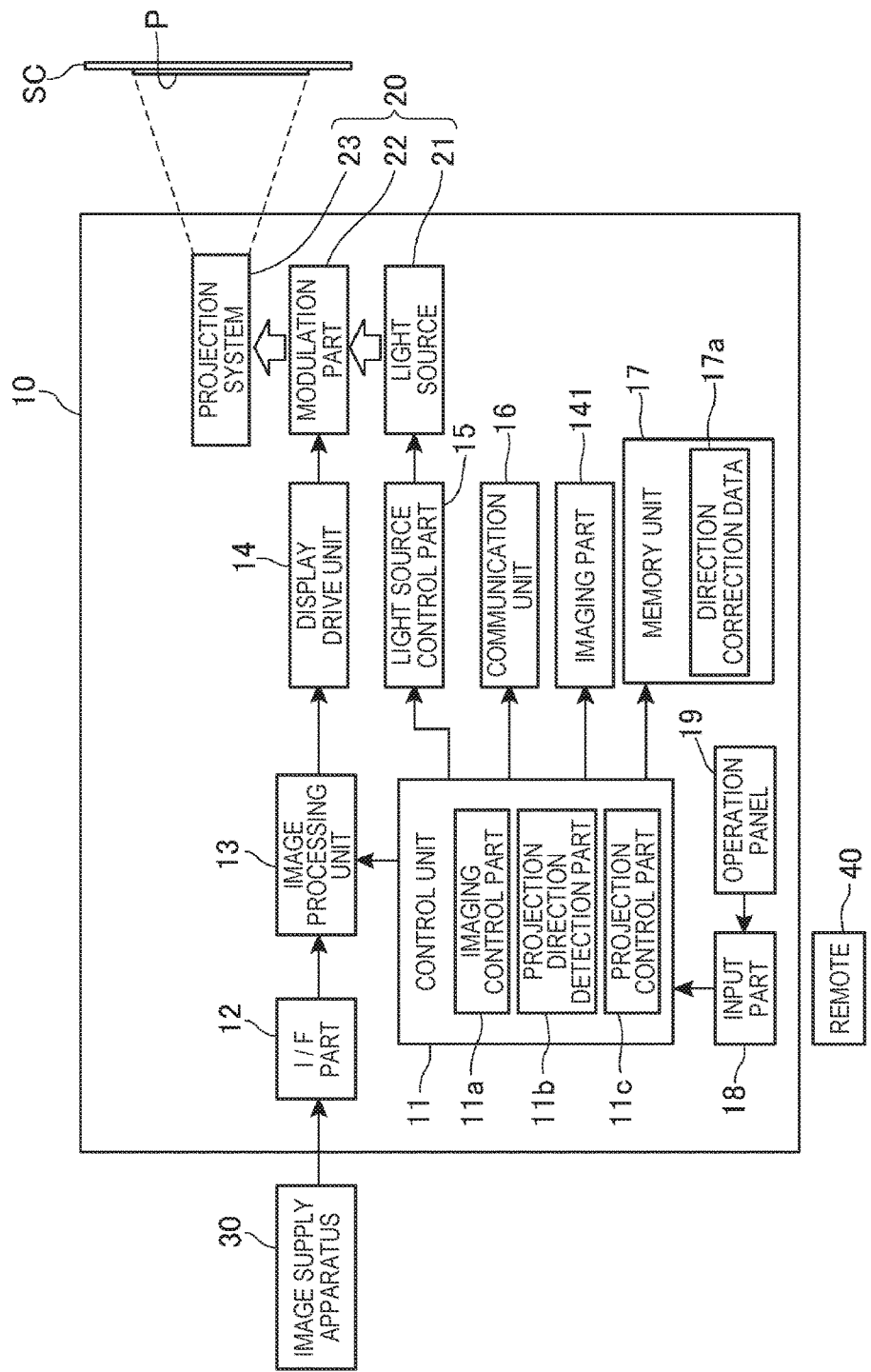
FIG. 4 is a functional block diagram showing a configuration of a control system of the projector.

FIG. 4 is a functional block diagram showing a configuration of the control system 10 of the projector 100.

The control system 10 of the projector 100 includes an interface (I/F) part 12 that connects an image supply apparatus 30 that outputs image data.

The image supply apparatus 30 includes e.g. an image reproduction apparatus such as a DVD player, a broadcast receiving apparatus such as a digital television tuner, and an image output apparatus such as a video game machine or personal computer. The image supply apparatus 30 may be a communication apparatus that communicates with a personal computer or the like and receives image data. Or, the image supply apparatus 30 is not limited to an apparatus that outputs digital image data, but may be an apparatus that outputs analog image signals. In this case, an analog/digital converter that generates digital image data from analog image signals may be provided on the output side of the image supply apparatus 30 or in the I/F part 12. Further, specific specifications and numbers of connectors and interface circuits of the I/F part 12 are arbitrary.

The image supply apparatus 30 outputs digital image data in a data format that can be supported by the I/F part 12. The contents of data may be still images or moving images (videos) as long as the data input by the image supply apparatus 30 is in the data format that can be supported by the I/F part 12. In the following explanation, the data input to the control system 10 from the image supply apparatus 30 is referred to as "image data".

The control system 10 includes a control unit 11 that controls the respective parts of the projector 100, and the light projection unit 20 that displays (projects) images based on the image data input to the I/F part 12 on the screen SC. Further, an image processing unit 13 that processes image data and outputs image signals for display to the light projection unit 20 is connected to the I/F part 12.

The image processing unit 13 executes processing of color tone correction etc. on the image data input to the I/F part 12 according to the control of the control unit 11. The image data processed by the image processing unit 13 is converted into image signals with respect to each frame and input to a display drive unit 14. Further, the image processing unit 13 may also display image data stored in a memory unit 17. In this case, the image data stored in the memory unit 17 is input from the control unit 11 to the image processing unit 13, and the image processing unit 13 performs processing on the image data and outputs image signals to the display drive unit 14.

The control unit 11 includes e.g. a CPU, ROM, and RAM (not shown), and controls the respective parts of the control system 10 by the CPU executing programs stored in the ROM.

The control unit 11 executes the above described programs, and thereby, performs control of the operation of projecting images, control of correcting the projected images, etc. by the projector 100. The control unit 11 controls execution times, execution conditions, etc. of the processing executed by the image processing unit 13. Further, the control unit controls a light source control part 15 of the light projection unit 20 to perform adjustment of luminance of a light source 21 etc.

The control unit 11 includes an imaging control part 11a, a projection direction detection part 11b, and a projection control part 11c as functional parts that control the projector 100.

The control unit 11 is connected to an input part 18 that receives input operation by a user. The input part 18 is connected to an operation panel 19 with switches and detects operation in the operation panel 19. Further, the input part 18 is formed as an infrared receiving part that receives infrared signals transmitted by a remote 40 and detects operation in the remote 40. The input part 18 outputs operation data representing the operation in the operation panel 19 and the remote 40 to the control unit 11.

The memory unit 17 is connected to the control unit 11. The memory unit 17 is a memory device that stores programs and data to be executed by the CPU of the control unit 11 in a non-volatile manner. The memory unit 17 stores control programs for controlling the control system 10 by the control unit 11, various kinds of setting data to be processed in the control programs, etc. The memory unit 17 of the embodiment stores direction correction data 17a. The direction correction data 17a is data containing parameters, setting values, etc. to be used by the projection control part 11c for processing.

Further, the imaging part 141 is connected to the control unit 11. The one imaging part 141 is shown in FIG. 4, however, two imaging parts 141 may be respectively connected to the control unit 11. Or, a camera interface circuit (not shown) that selects one of the two imaging parts 141 and acquires and outputs the captured images to the control unit 11 may be provided, and the two imaging parts 141 may be connected to the camera interface circuit. Or, when the imaging unit 140 is detachably formed, a configuration that the connection between the control unit 11 and the imaging part 141 is released by detachment of the imaging unit 140 may be employed.

Further, a communication unit 16 is connected to the control unit 11. The communication unit 16 executes wireless data communications compliant with standards including wireless LAN (Wi-Fi (registered trademark)) and Bluetooth (registered trademark) with an external apparatus of the projector 100. The communication unit 16 may perform communications via a cable.

The imaging control part 11a controls the imaging part 141 to execute imaging and acquires captured image data. The imaging control part 11a may allow only one of the two imaging parts 141 of the projector 100 to execute imaging or allows the two imaging parts 141 to capture images and acquire captured image data from the respective imaging parts 141.

The projection direction detection part 11b analyzes the captured image data of the imaging part 141, and thereby, detects the direction of the optical axis L (FIG. 1). The processing executed by the projection direction detection part 11b is processing of calculating the angle of the rotation of the optical axis L based on the captured images of the imaging part 141 described with reference to FIGS. 3A to 3F.

The projection control part 11c controls the image processing unit 13, the display drive unit 14, and the light source control part 15 to project a projected image P based on the image data input from the image supply apparatus 30 to the I/F part 12 on the screen SC. Further, the projection control part 11c allows the image processing unit 13 to execute correction processing corresponding to the direction of the optical axis L detected by the projection direction detection part 11b.

Assuming that the projection unit main body 120 is opposed to the screen SC as the projection surface in the above described reference state, when the optical axis L is rotated about the Y-axis, the optical axis L is along an upward or downward oblique direction with respect to the screen SC. Accordingly, trapezoidal distortion in the longitudinal directions (height directions) is generated in the projected image P on the screen SC.

Or, when the optical axis L is rotated about the Z-axis, the optical axis L is along the lateral oblique direction with respect to the screen SC, and thereby, trapezoidal distortion in the lateral directions (horizontal direction) is generated in the projected image P on the screen SC.

The projection control part 11c allows the image processing unit 13 to execute trapezoidal distortion correction processing corresponding to the rotation angles of the optical axis L about the Y-axis and the Z-axis. The memory unit 17 stores the direction correction data 17a containing processing conditions, parameters, etc. for the image processing unit 13 to perform trapezoidal distortion correction. The direction correction data 17a is e.g. parameters of the trapezoidal distortion correction corresponding to the rotation angles of the optical axis L about the Y-axis and the Z-axis. The projection control part 11c reads and outputs the parameters etc. corresponding to the rotation angles detected by the projection direction detection part 11b from the direction correction data 17a to the image processing unit 13, and thereby, may quickly correct the distortion of the projected image P.

Further, when the optical axis L rotates about the X-axis, the projected image P rotates within the plane of the screen SC. When the rotation is a motion intended by the user, the control unit 11 does not perform correction. When the correction of the rotation of the projected image P is set or instructed by the operation of the operation panel 19 or remote 40, the projection control part 11c corrects the rotation of the projected image P. Thereby, the image processing unit 13 is allowed to execute processing of rotating the image or the like so that the projected image P may be the same as that when the projected image P is projected on the screen SC opposed to the projection unit main body 120 in the reference state.

The light projection unit 20 includes the light source 21, a modulation part 22 that modulates the light emitted by the light source 21 and generates image light, and a projection system 23 that projects the image light modulated by the modulation part 22 on the screen SC and forms the projected image P.

The light source 21 includes a lamp such as a halogen lamp, xenon lamp, or ultrahigh-pressure mercury lamp or a solid-state light source such as an LED or laser light source. The light source 21 turns on by electric power supplied from the light source control part 15 and emits light toward the modulation part 22. The light source control part 15 may adjust light emission luminance of the light source 21 according to the control of the control unit 11.

The modulation part 22 modulates the light emitted by the light source 21 and generates image light and irradiates the projection system 23 with the image light. The display drive unit 14 drives the respective pixels of the light modulation device based on the image signals output by the image processing unit 13, and draws images in units of frame (picture) on the light modulation device.

The projection system 23 includes a lens that images the light modulated by the modulation part 22 on the screen SC. Further, the projection system 23 may include various kinds of lenses or lens groups such as a zoom lens and focus lens.

Figure 5:
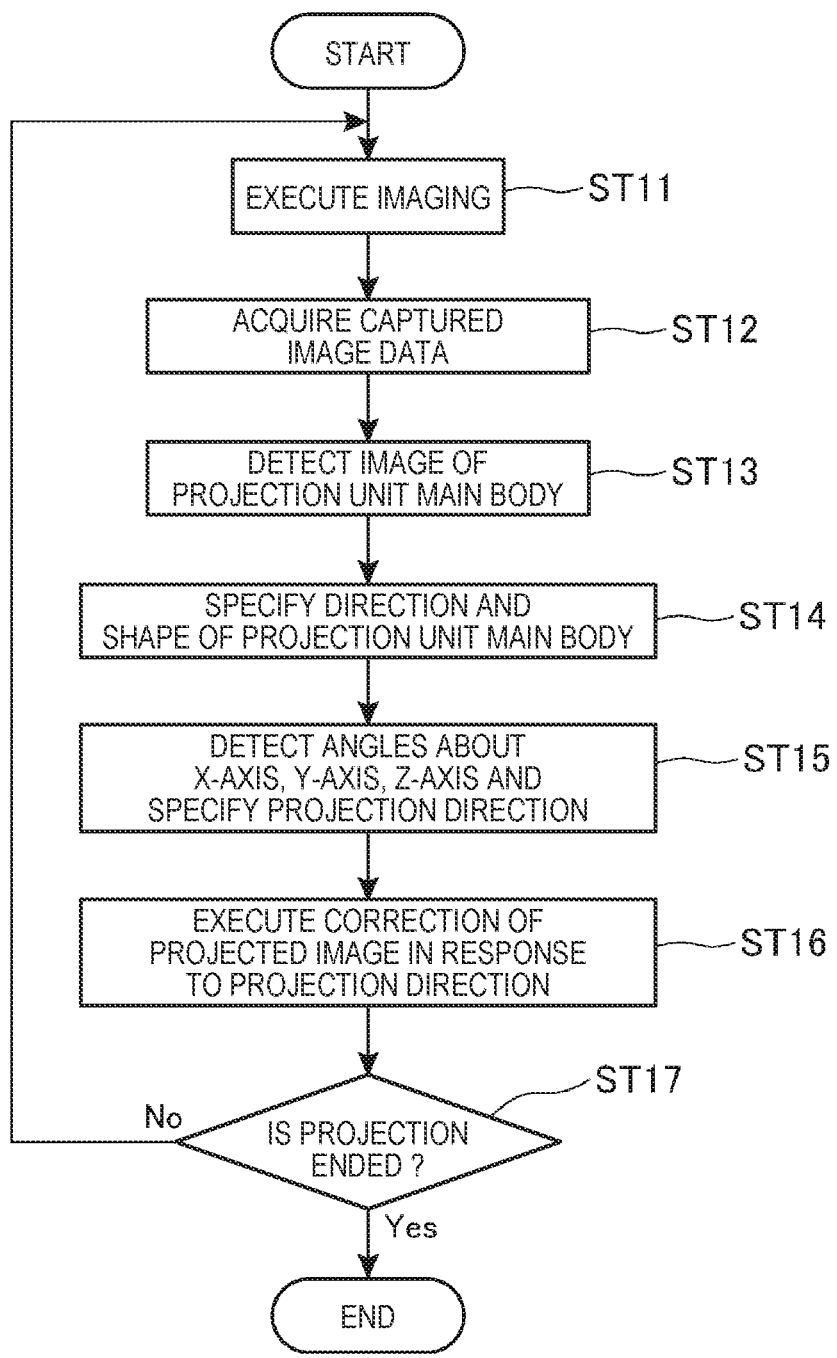
FIG. 5 is a flowchart showing an operation of the projector.

FIG. 5 is a flowchart showing an operation of the projector 100.

The operation in FIG. 5 is an operation of detecting the direction of the optical axis L based on the captured image of the imaging part 141 and correcting the projected image P. The operation in FIG. 5 is executed when an instruction is input by the operation of the operation panel 19 or remote 40 during projection of the projected image P by the projector 100. In the operation, the control unit 11 functions as a detection unit.

The control unit 11 respectively controls the two imaging parts 141 to execute imaging (step ST11). The control unit 11 acquires captured image data from the respective imaging parts 141 (step ST12).

Here, the control unit 11 may select one of the captured image data of the two imaging parts 141 as an object to be processed or may treat the captured image data in the order of the captured image data input from the imaging parts 141. Further, the unit may process the two imaging parts 141 at the same time. For example, the two imaging parts 141 may be coupled or combined and single image data to be processed may be generated.

The control unit 11 detects the image of the projection unit main body 120 from the captured image data to be processed (step ST13), and specifies the direction and shape of the detected image of the projection unit main body 120 (step ST14). The control unit 11 compares the direction and shape of the image of the projection unit main body 120 specified at step ST14 with the reference state and performs the above described arithmetic processing etc., and thereby, calculates the rotation angles of the optical axis L about the X-axis, Y-axis, and Z-axis, i.e., the projection direction (step ST15).

Then, the control unit 11 executes the correction of the projected image P in response to the calculated projection direction (step ST16). For example, the control unit 11 acquires the data for correction in correspondence with the calculated projection direction from the direction correction data 17a and sets the data in the image processing unit 13, and performs the correction.

Then, the control unit 11 determines whether the condition of ending the projection holds or not (step ST17). If the condition of a projection end holds (step ST17: Yes) such that the projection end is instructed by the operation of the operation panel 19 or remote 40 or the image supply apparatus 30 stops output of image data, the control unit 11 ends the processing.

On the other hand, when the projection is not ended (step ST17: No), the control unit 11 returns to step ST11 and continues the processing.

As described above, the projector 100 according to the embodiment to which the invention is applied includes the light projection unit 20 that projects images, the projection unit main body 120 that houses the light projection unit 20, and the power supply housing part 110 that supports the projection unit main body 120. Further, the projector includes the imaging part 141 provided in either of the power supply housing part 110 or the projection unit main body 120, and the control unit 11 that detects a relative position or relative direction between the projection unit main body 120 and the power supply housing part 110 based on the captured image of the imaging part 141. Thereby, the relative position or relative direction between the power supply housing part 110 and the projection unit main body 120 may be detected using the captured images of the imaging part 141.

In the embodiment, the imaging part 141 is provided in the power supply housing part 110 and images the projection unit main body 120. According to the configuration, the relative position or relative direction between the projection unit main body 120 and the power supply housing part 110 may be detected by the simple configuration using the imaging part 141. Accordingly, for example, when the projection unit main body 120 moves with respect to the power supply housing part 110 and the relative position or relative direction changes, the change may be detected. Further, even in a configuration with a higher degree of freedom of motion, the configuration is not necessarily complicated therefor.

The imaging part 141 may be provided on the projection unit main body 120 side and image the power supply housing part 110, and thereby, the control unit 11 may obtain the relative position or relative direction between the power supply housing part 110 and the projection unit main body 120.

Further, the control unit 11 detects the relative position or relative direction between the projection unit main body 120 and the power supply housing part 110 based on the change of the projection unit main body 120 or the power supply housing part 110 contained in the captured image of the imaging part 141 from the reference state. Accordingly, the relative position or relative direction between the projection unit main body 120 and the power supply housing part 110 may be quickly obtained using the captured images.

In the imaging unit 140, as shown in FIG. 2D, the cover having the reference lines 141*a* (reference scales) is provided. That is, the reference lines 141*a* are provided in the imaging range of the imaging part 141. The control unit 11 detects the image of the reference lines 141*a* and the image of the projection unit main body 120 appearing in the captured image of the imaging part 141, and detects the relative position or relative direction between the projection unit main body 120 and the power supply housing part 110. Accordingly, the relative position or relative direction between the projection unit main body 120 and the power supply housing part 110 may be detected using the reference lines 141*a* by higher-accuracy and lighter-load processing. Here, the cover may be rotatably attached to the imaging lens. Further, the imaging part 141 may be detachably provided in the power supply housing part 110. In this case, the imaging part 141 may be attached to the power supply housing part 110 and used, and may be detached when the imaging part 141 is not used.

In the above described embodiment, the example in which the control unit 11 detects the rotation angles of the optical axis L about the X-axis, Y-axis, and Z-axis is explained. The rotation angles are examples of the relative position relationship or relative direction between the power supply housing part 110 and the projection unit main body 120. That is, the control unit 11 may calculate the relative position between the power supply housing part 110 and the projection unit main body 120 from the rotation angles of the optical axis L about the X-axis, Y-axis, and Z-axis or may obtain the relative angle. Or, the control unit 11 may obtain the relative position and/or relative angle between the power supply housing part 110 and the projection unit main body 120 directly from the captured image of the imaging part 141.

The projection unit main body 120 is coupled to the power supply housing part 110 by the ball joint 132 that can rotate about at least one axis, and the control unit 11 detects the relative angles between the projection unit main body 120 and the power supply housing part 110 around the ball joint 132.

Note that the above described respective embodiments just show an aspect of the invention and modification and application can be arbitrarily made within the scope of the invention.

For example, the modulation part 22 may have a configuration using a transmissive liquid crystal light valve, a configuration using a reflective liquid crystal panel, or a configuration including a digital mirror device (DMD). Or, the part may have a configuration that separates light of the light source into three color lights and modulates the respective color lights using liquid crystal panels or DMDs, or a configuration including a combination of a single liquid crystal panel or DMD and a color wheel. Further, the projector 100 is not limited to the configuration provided on the front side of the screen SC and projecting the projected image P on the front surface of the screen SC, but may be a rear-projection-type projector provided on the rear side of the screen SC. Furthermore, the screen SC may be a wall surface.

For example, as shown in FIGS. 3A) to 3F, a predetermined marker (mark) may be provided on the upper surface of the projection unit main body 120 (within the imaging range of the imaging part 141) so that the position and the orientation of the projection unit main body 120 may be easily detected from the captured image of the imaging part 141. The marker may be provided by painting or attachment, have a pattern with color and tone that can be optically detected, and may have a geometric pattern such as a stripe pattern or checkerboard pattern. In this case, the relative position or relative direction between the projection unit main body 120 and the power supply housing part 110 may be quickly obtained with reference to the marker.

In the above described embodiment, as explained with reference to FIGS. 3A to 3F, the configuration of detecting the rotation of the projection unit main body 120 based on the captured image D of the imaging part 141 is explained. The invention is not limited to that, but an inertial sensor such as a gravity sensor (acceleration sensor) may be provided in the projection unit main body 120 and the angle and direction of the rotation of the projection unit main body 120 may be obtained using the detection result of the inertial sensor and the captured image D.

Further, in the above described embodiment, the configuration in which the imaging part 141 is provided in the power supply housing part 110 is explained, however, the invention is not limited to that. The imaging part 141 may be provided in the projection unit main body 120. In this case, the control unit 11 may obtain the relative position or direction based on the image of the power supply housing part 110 appearing in the captured image of the imaging part 141. In this example, scales indicating the longitudinal direction and the width direction of the projection unit main body 120 may be provided on the cover 141*b* of the imaging part 141, and a marker M may be formed on the lower surface of the power supply housing part 110.

Furthermore, in the above described embodiment, the example in which the control unit 11 obtains the relative position or direction by analyzing the captured image of the imaging part 141 is explained, however, the control unit 11 may transmit the captured image data of the imaging part 141 to an external computer by the communication unit 16. In this case, the external computer of the projector 100 may obtain the relative position or direction between the power supply housing part 110 and the projection unit main body 120, or may generate parameters for correction corresponding to the obtained position and direction.

The respective functional blocks shown in FIG. 4 show the functional configurations realized by cooperation of hardware and software, and the specific implementation is not particularly limited. Therefore, it is not necessarily implement hardware corresponding to the respective functional blocks, and a configuration in which the functions of the plurality of functional parts are realized by one processor executing programs can be employed. Further, part of the functions realized by software in the above described embodiment may be realized by hardware, or part of the functions realized by hardware may be realized by software. In addition, the specific detailed configurations of the other respective parts of the projector 100 can be arbitrarily changed without departing from the scope of the invention.

The entire disclosure of Japanese Patent Application No. 2015-068263, filed Mar. 30, 2015 is expressly incorporated by reference herein.

REFERENCE SIGNS LIST

10 . . . control system, 11 . . . control unit (detection unit), 11a . . . imaging control part, 11b . . . projection direction detection part, 11c . . . projection control part, 13 . . . image processing unit, 17 . . . memory unit, 17a . . . direction correction data, 20 . . . light projection unit, 100 . . . projector, 110 . . . power supply housing part (attachment part), 120 . . . projection unit main body (main body), 125 . . . front surface, 128 . . . projection opening, 131 . . . supporting shaft, 132 . . . ball joint (coupling part), 140 . . . imaging part 141 . . . imaging part, 141a . . . reference line, 141b . . . cover, 200 . . . lighting duct, A1, A2 . . . imaging range, D . . . captured image, L . . . optical axis, P . . . projected image, SC . . . screen.

The invention claimed is:

1. A projector comprising:
a projection unit that projects an image;
a main body that houses the projection unit;
an attachment part that supports the main body;
an imaging part disposed on an outer surface of the attachment part; and
a detection unit that detects a change of position of one of the main body and the attachment part with respect to an other of the main body and the attachment part, based on a captured image of the imaging part.

2. The projector according to claim 1, wherein the detection unit detects the relative position or relative direction between the main body and the attachment part based on a change of the main body or attachment part contained in the captured image of the imaging part from a reference state.

3. The projector according to claim 1, wherein a reference scale is provided in the imaging range of the imaging part, and
the detection unit detects the relative position or relative direction between the main body and the attachment part by detecting an image of the reference scale and an image of the main body appearing in the captured image of the imaging part.

4. The projector according to claim 3, wherein the imaging part includes an imaging lens, and
a cover is attached to the imaging lens and the reference scale is formed in the cover.

5. The projector according to claim 4, wherein the cover is rotatably attached with respect to the imaging lens.

6. The projector according to claim 1, wherein the imaging part is detachably provided in the attachment part or the main body.

7. The projector according to claim 1, further comprising a correction unit that corrects an image projected by the projection unit based on the relative position or relative direction between the main body and the attachment part detected by the detection unit.

8. A projector comprising:
a projection unit that projects an image;
a main body that houses the projection unit;
an attachment part that supports the main body;
an imaging part provided in one of the attachment part and the main body; and
a detection unit that detects a change of position of one of the main body and the attachment part with respect to an other of the main body and the attachment part, based on a captured image of the imaging part,
wherein the main body is coupled to the attachment part by a coupling part that can rotate about at least one axis
wherein the detection unit detects a relative angle between the main body and the attachment part around a rotation axis of the coupling part,
wherein a reference scale is provided in the imaging range of the imaging part,
wherein the detection unit detects the relative position or relative direction between the main body and the attachment part by detecting an image of the reference scale and an image of the main body appearing in the captured image of the imaging part,
wherein the imaging part includes an imaging lens, and
wherein a cover is attached to the imaging lens and the reference scale is formed in the cover.

9. The projector according to claim 8 wherein the main body is further coupled to the attachment part by a rod-shaped supporting part that is fixed to the attachment part.

10. A control method for a projector by the projector including a main body housing a projection unit that projects an image and an attachment part that supports the main body, comprising:
detecting a change of position of one of the main body and the attachment part with respect to an other of the main body and the attachment part, based on a captured image of an imaging part disposed on an outer surface of the attachment part; and
correcting a projected image based on the detected relative position or relative direction.

* * * * *

UNITED STATES PATENT AND TRADEMARK OFFICE
CERTIFICATE OF CORRECTION

| | |
|---|---|
| PATENT NO. | : 10,469,815 B2 |
| APPLICATION NO. | : 15/560309 |
| DATED | : November 5, 2019 |
| INVENTOR(S) | : Hirofumi Kasuga |

It is certified that error appears in the above-identified patent and that said Letters Patent is hereby corrected as shown below:

On the Title Page

Item (73), change "SEIKO EPAON CORPORATION" to --SEIKO EPSON CORPORATION--

Signed and Sealed this
Fourteenth Day of January, 2020

Andrei Iancu
*Director of the United States Patent and Trademark Office*